US006495785B1

(12) United States Patent
Meyer (10) Patent No.: US 6,495,785 B1
(45) Date of Patent: Dec. 17, 2002

(54) NON-GLUE MOUNTING OF NON-METALLIC TUBES

(75) Inventor: Jeffry Meyer, Greensburg, PA (US)

(73) Assignee: ABB Power T&D Company Inc., Raleigh, NC (US)

(*) Notice: Subject to any disclaimer, the term of this patent is extended or adjusted under 35 U.S.C. 154(b) by 44 days.

(21) Appl. No.: 09/606,835

(22) Filed: Jun. 29, 2000

(51) Int. Cl.[7] .............................................. H01H 33/82
(52) U.S. Cl. ....................................................... 218/43
(58) Field of Search .......................... 218/43, 44, 45, 218/48, 49–50, 58, 61, 68, 69, 74, 78, 84, 154, 155

(56) References Cited

U.S. PATENT DOCUMENTS

| 1,246,023 A | 11/1917 | Kirkham |
| 2,369,697 A | 2/1945 | Werkenthin et al. |
| 3,008,368 A | 11/1961 | Hammitt et al. |
| 3,103,887 A | 9/1963 | Neeple |
| 3,135,126 A | 6/1964 | Militana |
| 4,442,329 A | 4/1984 | Gray et al. |
| 4,621,962 A | 11/1986 | Rozniecki |
| 4,780,581 A | * 10/1988 | Holmgren et al. ............. 218/43 |
| 5,453,591 A | * 9/1995 | Stroud ........................... 218/57 |
| 5,495,084 A | * 2/1996 | Meyer et al. .................. 218/43 |
| 5,504,289 A | 4/1996 | Smith et al. |
| 5,584,628 A | 12/1996 | Bernoni |
| 5,629,869 A | 5/1997 | Johnson et al. |

FOREIGN PATENT DOCUMENTS

JP          54-16242       6/1979

OTHER PUBLICATIONS

Johnson, D. et al., "The Seismic Design and Testing of ABB Dead Tank Circuit Breakers," Copyright 1992, ABB Power T&D Company Inc., pp. 1–8, (no month).

D. Johnson et al., "New Technology in $SF_6$ Breakers," ABB Power T&D Company Inc., 1989, (no month).

Freeman, Willie B., et al., "Applications of New Insulator Technologies on Circuit Breaker Bushings: an OEM's Perspective," *Insulator 2000*, Nov. 1999, pp. 1–8.

Freeman, Willie B. et al., "Development of High Interrupting Current and EHV Circuit Breakers," 1999 ABB Electric Utility Conference, Mar. 22–30, 1999, pp. 1–10.

D.S. Johnson et al., "Development of the Type 145 PM Self–Blast Circuit Breaker," 1991 Doble Client Conference, Boston, Apr. 9, 1991, Asea Brown Boveri, pp. 1–10.

Descriptive Bulletin 33–220A, "Type PM Dead Tank: SF6 Power Circuit Breakers 362 Through 550 kV," ABB Power T&D Company Inc., Apr. 1991.

Descriptive Bulletin 32–110A, "Vertical–Break Group–Operated Outdoor Disconnect Switches," ABB Power T&D Company Inc., Jul. 1991, pp. 1–12.

Descriptive Bulletin 33–200A, Type PM $SF_6$ Power Circuit Breaker, ABB Power T&D Company Inc, Nov. 1991.

Descriptive Bulletin, 33–400A, "Type ELF Live Tank: $SF_6$ Power Circuit Breakers 242 Through 800kV," ABB Power T&D Company Inc., May 1992.

Descriptive Bulletin, 33–230–A, "Type PMR & PMRI Circuit Breaker," ABB Power T&D Company Inc., Jun. 1995.

(List continued on next page.)

*Primary Examiner*—Lincoln Donovan
(74) *Attorney, Agent, or Firm*—Woodcock Washburn (57) ABSTRACT

A switching device has an improved fastening arrangement to join an electrical insulating body with a conductive metal mounting piece or flange. The fastening arrangement involves a plurality of standard hardware fasteners. The quantity of fasteners required to join the insulating body and flange is dependent upon the desired strength of the joint and the size (or diameter if the insulating body is tubular shaped) of the insulating body.

35 Claims, 8 Drawing Sheets

OTHER PUBLICATIONS

Descriptive Bulletin 33–210–A, "Type PM Circuit Breaker," ABB Power T&D Company Inc, Mar. 1997.

Descriptive Bulletin, 33–231A, "Type PMG & PME Circuit Breaker 242kV through 362 kV," ABB Power T&D Company Inc., Aug. 1998.

Descriptive Bulletin, 32–111A, "Type TTR8," ABB Power T&D Company Inc., Jan. 1999.

Descriptive Bulletin, 33–502A, "Type CSL Circuit Switcher: 145 kV & 170 kV," ABB Power T&D Company Inc., Feb. 1999.

* cited by examiner

FIG. 3

Prior Art

NON-GLUE MOUNTING OF NON-METALLIC TUBES

FIELD OF THE INVENTION

The present invention relates generally to electrical switching devices. More particularly, the present invention relates to electrical switching devices that have a novel fastening arrangement for joining an electrical insulator, or a non-metallic tube, to a metal conductive flange within an electrical switching device using standard hardware.

BACKGROUND OF THE INVENTION

A high voltage circuit breaker is a device used in the transmission and distribution of three phase electrical energy. When a sensor or protective relay detects a fault or other system disturbance on the protected circuit, the circuit breaker operates to physically separate current-carrying contacts in each of the three phases by opening the circuit to prevent the continued flow of current. In addition to its primary function of fault current interruption, a circuit breaker is capable of load current switching. A circuit switcher and load break switch are other types of switching device. As used herein, the expression "switching device" encompasses circuit breakers, circuit switches, dead tank breakers, live tank breakers, load break switches, reclosers, and any other type of electrical switch.

The major components of a circuit breaker or recloser include the interrupters, which function to open and close one or more sets of current carrying contacts housed therein; the operating mechanism, which provides the energy necessary to open or close the contacts; the arcing control mechanism and interrupting media, which interrupt current and create an open condition in the protected circuit; one or more tanks for housing the interrupters; and the bushings, which carry the high voltage electrical energy from the protected circuit into and out of the tank(s) (in a dead tank breaker). In addition, a mechanical linkage connects the interrupters and the operating mechanism.

Circuit breakers can differ in the overall configuration of these components. However, the operation of most circuit breakers is substantially the same. For example, a circuit breaker may include a single tank assembly which houses all of the interrupters. U.S. Pat. No. 4,442,329, Apr. 10, 1984, "Dead Tank Housing for High Voltage Circuit Breaker Employing Puffer Interrupters," discloses an example of the single tank configuration and is incorporated herein in its entirety by reference. Alternatively, a separate tank for each interrupter may be provided in a multiple tank configuration. An example of a prior art, multiple tank circuit breaker is depicted in FIGS. 1, 2, 3, and 4. Circuit breakers of this type can accommodate 72 kV, 145 kV, 242 kV, and 362 kV power sources.

Figures 1, 2:
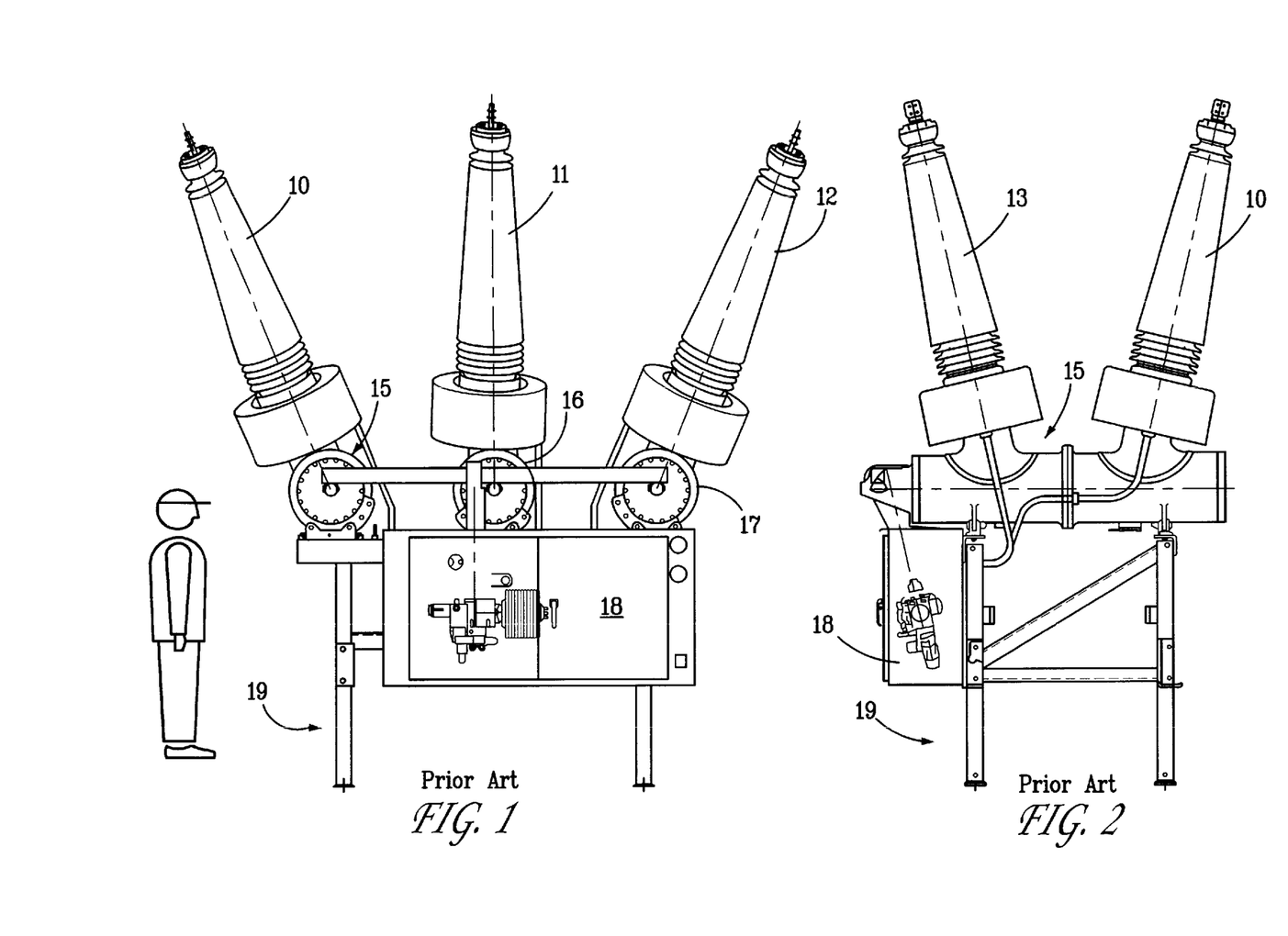
FIG. 1 (prior art) shows a typical three-pole circuit breaker of the prior art.
FIG. 2 (prior art) provides a side view of the three-pole circuit breaker of FIG. 1.

The circuit breaker shown in FIG. 1 is commonly referred to as a "dead tank" because it is at ground potential. FIG. 1 provides a front view of a three phase or three-pole circuit breaker having three entrance bushing insulators, 10, 11, and 12, that correspond to each respective phase. The bushing insulators may be comprised of porcelain, composite, or a hardened synthetic rubber sufficient to withstand seismic stresses as well as stresses due to the opening and closing of the interrupter contacts within the device. In high voltage circuit breakers, the bushings for each phase are often mounted so that their ends have a greater spacing than their bases to avoid breakdown between the exposed conductive ends of the bushings.

The circuit breaker is comprised of three horizontal puffer interrupter assemblies enclosed in cylindrical tanks 15, 16, and 17. Current transformers assemblies 20 and 21 (referring to FIG. 3), which comprise one of more circuit transformer and their exterior housing, are located underneath the bushing insulators on the exterior of the breaker to facilitate their replacement in field. Current transformers 20 and 21 measure outgoing current.

FIG. 2 provides a side view of the three-pole circuit breaker of FIG. 1 that shows the corresponding exit bushing insulator, 13, of the interrupter assembly housed in tank 15. FIG. 2 illustrates how entrance bushing insulator 10 and exit bushing insulator 13 is associated with tank 15. The entrance and exit bushing insulators for the interrupters in tanks 16 and 17 (not shown in FIG. 2) are arranged in a similar fashion. The devices, illustrated in FIGS. 1 through 3, have 3 pairs of entrance and exit bushing insulators, or a total of 6 bushing insulators.

Referring to FIG. 1 and FIG. 2, the three interrupter tank assemblies are mounted on a common support frame 19. The operating mechanism that provides the necessary operating forces for opening and closing the interrupter contacts is contained within an operating mechanism housing or cabinet 18. The operating mechanism is typically mechanically coupled to each of the interrupter assemblies through a common linkage such as a drive cam. The operating mechanisms can be, but are not limited to, compressible springs, solenoids, hydraulic, or pneumatic-based mechanisms.

Figure 3:
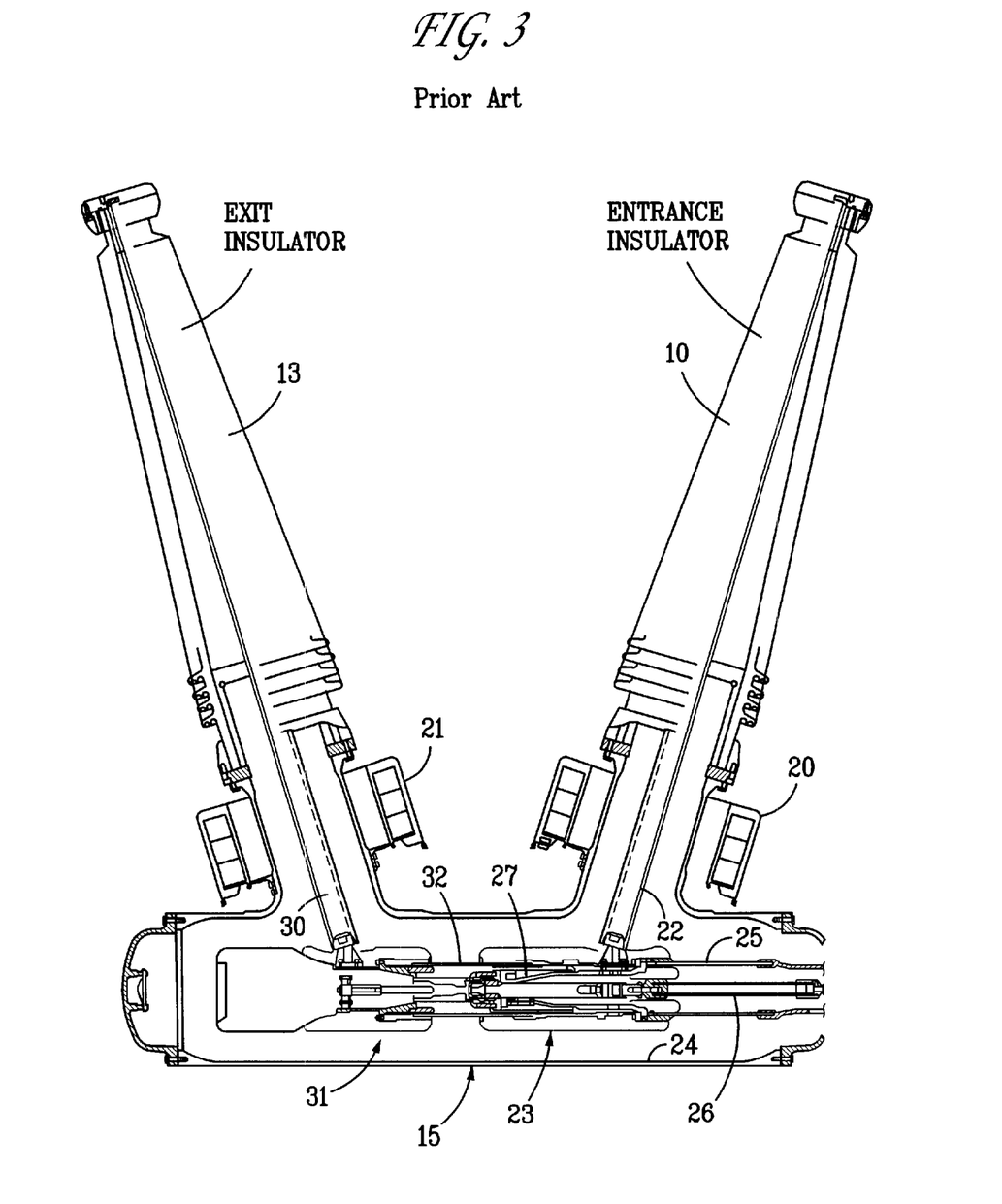
FIG. 3 (prior art) is a partial, cross-sectional view of the circuit interrupter assembly housed of FIG. 1 with its contacts open.

FIG. 3 is a partial, cross-sectional view of the interrupter assembly housed within cylindrical tank 15 and shown in FIG. 1 and FIG. 2. A typical circuit interrupter is comprised of stationary and movable contact assemblies 31 and 23, respectively. Entrance insulator bushing 10 houses a central conductor 22 which supports movable contact assembly 23 within conductive tank 24. Movable contact assembly 23 is affixed to an insulator tube 25 through which a linearly operating rod 26 extends. Rod 26 operates movable contact 27 between its open and closed position in a well-known fashion.

Exit insulator bushing 13 houses a central conductor 30 which is connected to the stationary contact assembly 31 and is also supported within conductive tank 24. An insulator tube 32 extends between the stationary contact assembly 31 and the movable contact assembly 23.

The interior volume of tank 24, as well as the entrance and exit insulating bushings 10 and 13, are preferably filled with an inert, electrically insulating gas such as $SF_6$. The electrically insulating gas fulfills many purposes. The arcing contacts within both the stationary and movable contact assemblies are subject to arcing or corona discharge when they are opened or closed. Such arcing can cause the contacts to erode and disintegrate over time. Current interruption must occur at a zero current point of the current waveshape. This requires the interrupter medium to change from a good conducting medium to a good insulator or non-conducting medium to prevent current flow from continuing. Therefore, a known practice (used in a "puffer" interrupter) is to fill a cavity of the interrupter with an inert, electrically insulating gas that quenches the arc formed. During operation of the contacts in assemblies 23 and 31, a piston, which moves with the movable contact in assembly 23, compresses the gas and forces it between the separating contacts and toward the arc, thereby cooling and extinguishing it. The gas also acts as an insulator between conductive parts within housing 15 and the wall of tank 24.

Referring again to FIG. 3, the circuit interrupter assembly is comprised of a combination of insulating materials, such as insulator tube 25 and insulator tube 32, and conductive materials that are joined together. Because the insulating and conductive materials have varying strengths, it is difficult to secure these materials together without damaging the comparatively weaker insulator. The insulator tube within the electrical switching device is typically made of a weak, non-metallic material. This tube is then joined to a metal flange that is conductive and is relatively tough in comparison to the insulator tube. The joint formed between the weaker insulating tube and the rigid conductive flange experiences both compressive and tensile stresses due to inter alia, seismic events, high amperage, gas pressure within the circuit interrupter, shipping of the device prior to installation, thermal cycling, and the continuous operation of the device itself.

Figure 4:
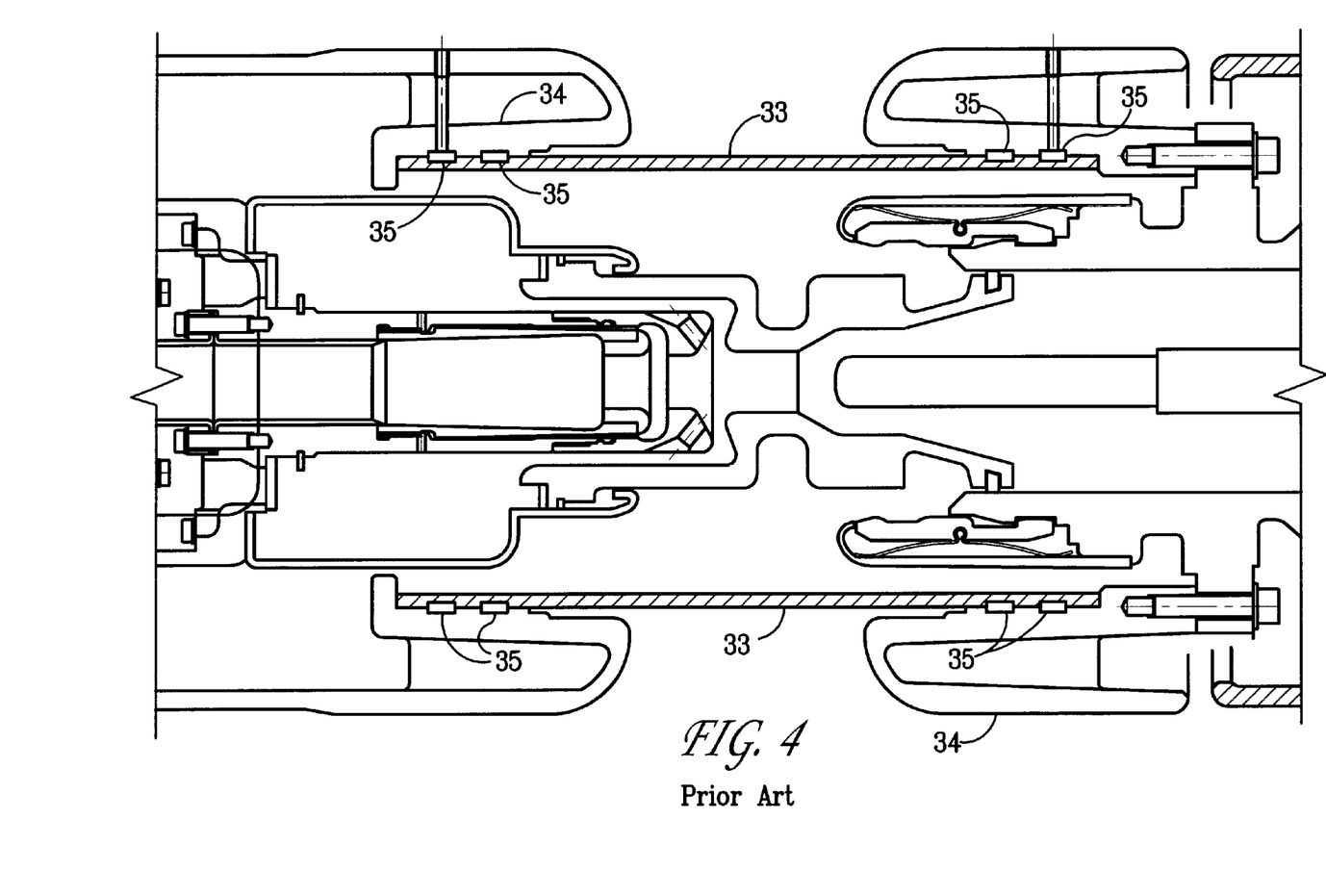
FIG. 4 (prior art) provides a partial, cross-sectional view of a circuit interrupter assembly of the prior art that utilizes chemical bonding to join the insulating body to the conductive flange.

Prior methods for attaching the insulator tube to the conductive flange use chemical bonding or glue. Other joinder methods, such as welding or clamping, are ineffective due to the disparity of strength and material differences of the insulator tube and conductive flange. FIG. 4 provides a cross-sectional view of the chemical joinder of the insulating tube and conductive flange of an electrical switching device of the prior art. Referring to FIG. 4, insulator tube 33 is joined to a metal mounting piece or flange 34 (which is part of the stationary or movable contact assemblies) by glue joints 35. The glue joints are typically located at periodic intervals or annularly around the external surface of tube 33.

Chemical joinder methods present numerous manufacturing problems. These methods increase cycle time due to the additional steps needed to fully cure the glue or finish the joint. The time required—to preheat, clean, glue the insulating tube and conductive flange on one end, glue the insulating tube and conductive flange on the opposite end, and cure—typically lasts one manufacturing workday and is a frequent source of production bottle-necks. Further, the method for gluing the assembly is prone to quality problems due to the difficulties in aligning the parts for the three different pole assemblies. The pole assemblies have to be correctly oriented for left, right, and center tank installations. Oftentimes, the operator errs in joining the insulator tube to the correct flange for the various installations. Thus, there is a fairly high rejection rate of assembly. Moreover, once the insulating tube and conductive, metallic flange are joined, the operator cannot disassemble and rework the joint or the assemblies contained therein without damaging the insulating tube. Lastly, there is also a safety and environmental concern because the workforce in the glue shop is exposed to potentially toxic chemicals as well as the high temperatures required for curing of the assembly.

SUMMARY OF THE INVENTION

The present invention provides electrical switching devices, more particularly an electrical switching device disposed between a pair of conductors, that have a novel fastening arrangement for directly and mechanically attaching an electrical insulating body, such as a non-metallic tube, to a conductive metal piece or flange within a conductive switching portion. The present invention uses standard hardware to provide a solid, reversible joint between a non-metallic, insulating body and a metal mating piece or flange that is subject to high voltage and high vibrational stress conditions. The fastening arrangement of the present invention reduces manufacturing cycle time, allows for manufacturing rework and reassembly, and minimizes the rejection rates associated with chemical bonding. Moreover, the joinder method of the present invention allows the insulating body and flange fit-up to have reasonable dimensional tolerances thereby reducing the cost and assembly difficulties of the final product due to the relative flexibility of the insulating tube material. The insulating body material deforms, or experiences localized crushing, at the areas where the fasteners are inserted. Because of this, a tight fit is achieved at the point of joinder.

According to the invention, the electrical switching device has a conductive switching portion, for carrying current between a pair of conductors, and a non-metallic, insulating body that comprises a hollow center in which a portion of the conductive switching portion contacts a portion of the insulating body. In preferred embodiments, a portion of the conductive switching assembly is inserted into the hollow center of the insulating body. The present invention may further comprise a conductive mounting piece, or flange, that is part of the switching device's contact assemblies or a subset of the conductive switching assembly. In preferred embodiments, the insulating body is tubular shaped. The insulating body and conductive flange are held together at one or more ends of the insulating body by securing the insulating body to a conductive piece or flange via a plurality of fasteners. These fasteners collapse or deform a portion of the insulating body against the portion of the conductive switching portion that contacts the insulating body. The dimensional tolerances of the insulating body with respect to the conductive flange are chosen to pre-load the insulating body against the conductive flange.

The fasteners that engage the insulating body and conductive switching portion, such as a conductive mounting piece or flange, are within close proximity to one or more of the ends of the insulating body. Preferably, the distance between the fasteners and the end of the insulating body is no less than a multiplier of 2 times the diameter of one of the fasteners. In more preferred embodiments, this distance is a multiplier of 3 times the diameter of one of the fasteners.

In preferred embodiments, the fasteners are inserted into the exterior surface of the insulating body and protrude slightly. The fasteners are positioned equidistantly (or circumferentially if the insulating body is tubular) with respect to each other around the perimeter, or circumference, of the insulating body or tube to uniformly attach the insulating body to the conductive flange. Depending upon the desired strength of the joint, the distance between the fasteners can be, but is not limited to, between about 1-½" to 2", between about 2" to about 3", or between about 3" to about 4" for a high strength, medium strength, or low strength joint, respectively.

The number of fasteners is dependent upon the size of the insulating body or diameter of the insulating tube. For electrical switching devices of the present invention, the number of fasteners is preferably between 4 and 32, or more preferably between 8 and 16, to provide reliable performance and properly distribute the applied load.

The fasteners used to join the insulating body and conductive flange in the present invention can be standard hardware, such as, but not limited to, retention bolt and nut combinations, screws, screw and nut combinations, screw or bolt and washer combinations, or rivets. In preferred embodiments, the fasteners are flat-head, allen bolts, or conical shaped, flat-headed bolts, that are threaded to engage the insulating body. In other embodiments, the fasteners selected are bolts in combination with a special conical-shaped nut or washer with a threaded insert. The conical shape for the fasteners is preferred to radially compress the insulating tube at the cone shape of the bolt, to pre-load the insulating material, and to prevent material degradation at the interface of the fastener and insulating body when variable loads are applied to the insulating body.

It is to be understood that both the foregoing general description and the following detailed description are exemplary and are intended to provide further explanation of the invention as claimed. The accompanying drawings are included to provide a further understanding of the invention. In the drawings, like reference characters denote similar elements throughout several views. It is to be understood that various elements of the drawings are not intended to be drawn to scale.

A more complete understanding of the present invention, as well as further features and advantages of the invention such as its application to other electrical devices within a substation or system, will be apparent from the following Detailed Description and the accompanying drawings.

Reference will now be made in detail to presently preferred embodiments of the invention, examples of which are illustrated in the accompanying drawings.

DETAILED DESCRIPTION OF PREFERRED EMBODIMENTS

The present invention provides electrical switching devices, more particularly an electrical switching device disposed between a pair of conductors, that have a novel fastening arrangement for directly and mechanically attaching an electrical insulating body, such as a non-metallic tube, to a conductive metal piece or flange within a conductive switching portion. The present invention uses standard hardware to provide a solid, reversible joint between a non-metallic, insulating body and a metal mating piece or flange that is subject to high voltage and high vibrational stress conditions. The fastening arrangement of the present invention reduces manufacturing cycle time, allows for manufacturing rework and reassembly, and minimizes the rejection rates associated with chemical bonding. Moreover, the joinder method of the present invention allows the insulating body and flange fit-up to have reasonable dimensional tolerances thereby reducing the cost and assembly difficulties of the final product due to the relative flexibility of the insulating tube material. The insulating body material deforms, or experiences localized crushing, at the areas where the fasteners are inserted. Because of this, a tight fit is achieved at the point of joinder.

Figure 5:
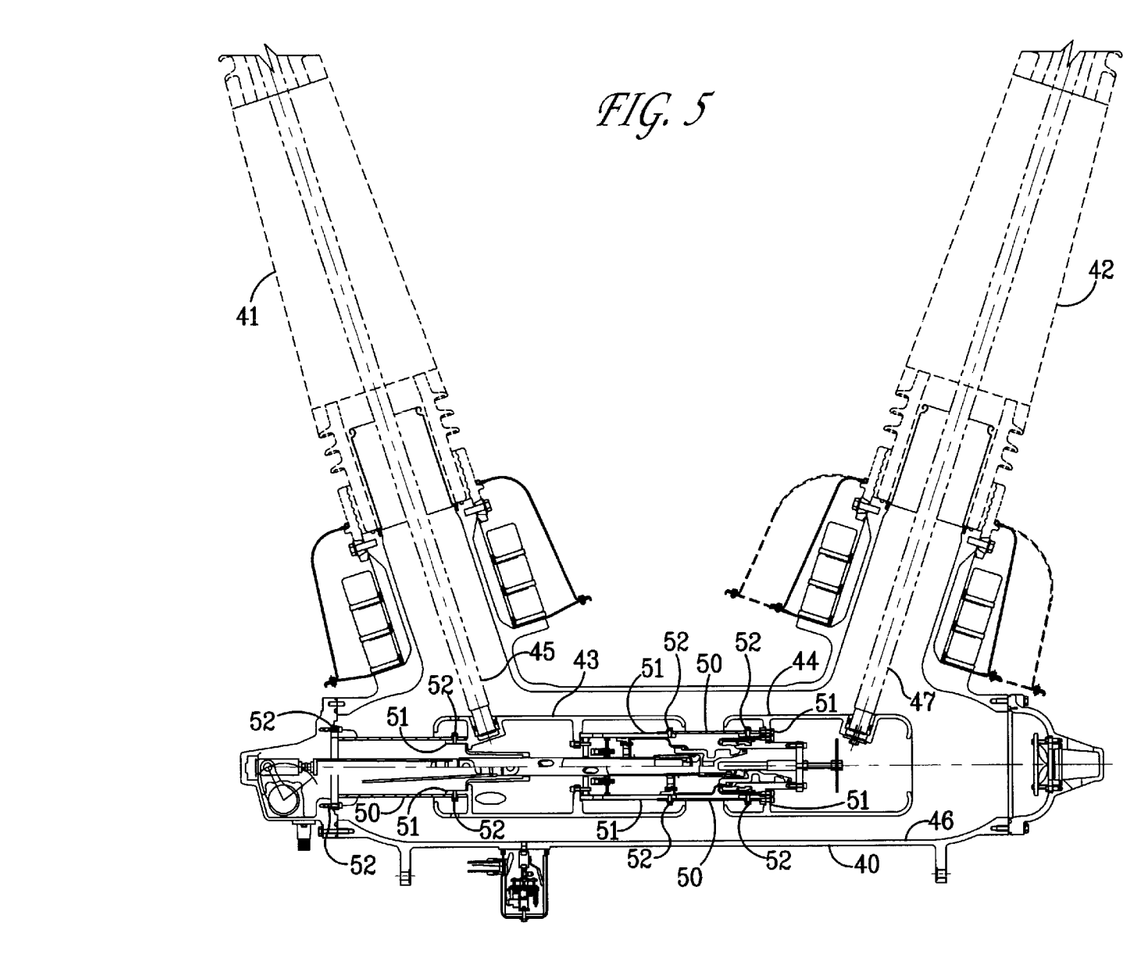
FIG. 5 provides a partial, cross-sectional view of a circuit interrupter assembly of the present invention.
Figure 6:
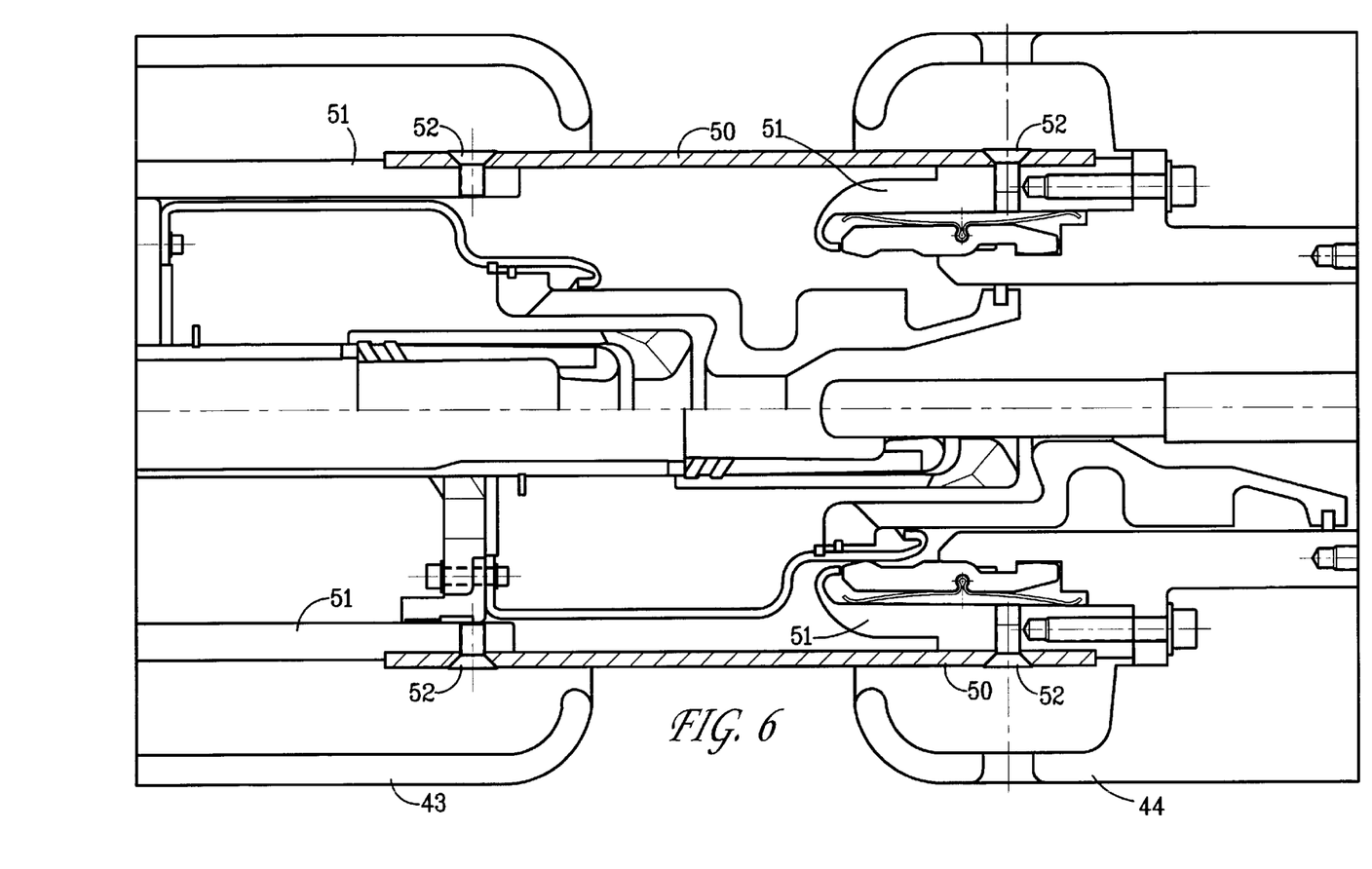
FIG. 6 provides a detailed, cross-sectional view of a circuit interrupter assembly of the FIG. 5 further illustrating the joinder of the insulating body and conductive flange.

An embodiment of the fastening arrangement of the present invention is depicted in FIG. 5 and FIG. 6. Both figures depict an electrical switching device that is suitable for three phase AC current. FIG. 5 is a partial, cross-sectional view of the interrupter assembly housed within cylindrical tank 40 and comprises entrance insulator bushing 41 and exit insulator bushing 42. FIG. 6 provides a more detailed side view of the circuit interrupter assembly of FIG. 5. The circuit interrupter of FIG. 5 is comprised of 10 movable and stationary contact assemblies 43 and 44, respectively. Entrance insulator bushing 41 houses a central conductor 45 which supports movable contact assembly 43 within conductive tank 46. Exit insulator bushing 42 houses a central conductor 47 which is connected to the stationary contact assembly 44 and is also supported within conductive tank 46. Current is passed through the pair of conductors, inlet (or entrance) central conductor 45 and outlet (or exit) central conductor 47. The interior volume of tank 46, as well as the entrance and exit insulating bushings 41 and 42, are preferably filled with an inert, electrically insulating gas such as $SF_6$.

Referring to FIG. 5 and the more detailed view presented in FIG. 6, the circuit interrupter assembly is comprised of a combination of insulating materials and conductive materials that are joined together. Insulator tube 50 extends between the stationary contact assembly 44 and the movable contact assembly 43 both assemblies and their sub-components contained therein are defined as the conductive switching portion of the device. In some embodiments, the conductive switching portion further may further comprise a piston for moving longitudinally to interrupt current between the pair of conductors. An additional insulator tube 50 extends between the movable contact assembly 43 and the wall of conductive tank 46. A portion of both the movable contact assembly 43 and stationary contact assembly 44, known as conductive mounting piece or conductive mounting flange 51, is affixed to an insulator tube 50 via a plurality of fasteners 52.

Insulating body 50 can be comprised of a variety of non-metallic materials, including but not limited to, alumina, polypropylene, polyester, polyimide, polycarbonate, PVC, polyamide, PBTP, KEVLAR® (a poly-paraphenylene terephthalamide manufactured by DuPont Corporation of Wilmington, Del.), NOMEX® (a poly-metaphenylene diamin manufactured by DuPont Corporation of Wilmington, Del.), and eDELRIN® (an acetal resin manufactured by DuPont Corporation of Wilmington, Del.). In some embodiments, insulating body 50 is a KEVLAR® in a resin base or a KEVLAR® reinforced epoxy fabric that is made via a vacuum impregnation process that allows it to exhibit a higher tensile strength and modulus. In yet other embodiments, insulating body 50 is comprised of a polyester cloth weave lay-up. Typical values for tensile modulus and tensile strength for the insulating body range from about 75 G Pa to about 200 G Pa and about 3.0 G Pa to about 4.0 G Pa, respectively. It is understood, however, to one skilled in the art that the tensile modulus, tensile strength, and other physical properties of insulating body 50 will vary depending upon the material selected. Insulating body 50 is preferably tubular shaped, but can have a variety of different geometries depending upon the requirements of the electrical switching device.

Conductive mounting piece or mounting flange 51 is comprised of a material such as, but not limited to, aluminum or stainless steel metal. The thickness and shape of mounting flange 51 varies depending upon the portion of movable contact assembly 43 and stationary contact assembly 44 that insulating body 50 originates from. Mounting flange 51 is preferably inserted into insulating body 50 such that the exterior surface of mounting flange 51 contacts the interior surface of each end of insulating body 50. Because of this, the geometry of conductive flange 51 must coincide with the geometry of insulating body 50. For example, if insulating body 50 is tubular shaped then conductive flange 51 is generally tubular shaped or ring-shaped.

Figure 7A:
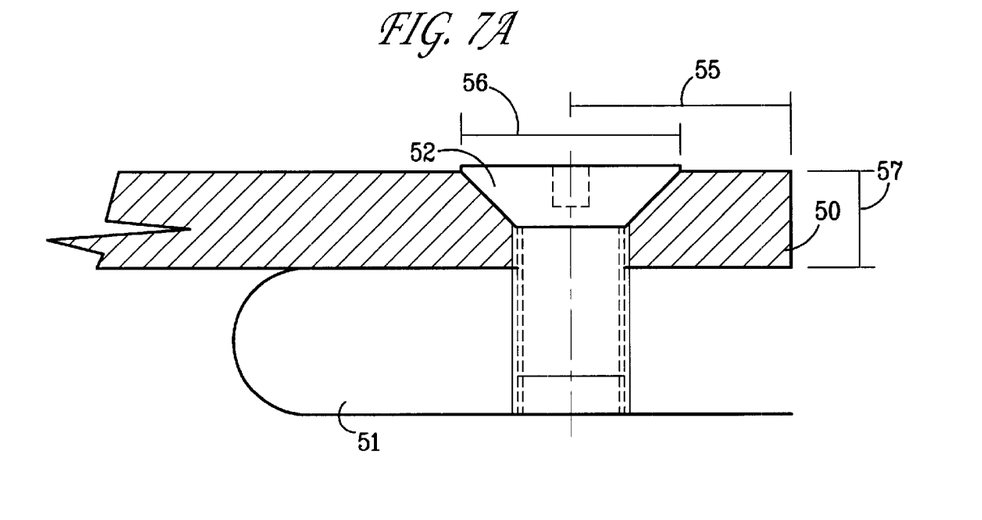
FIG. 7a provides a detailed view of a flat-headed, allen bolt fastener, used to join the insulating body to the conductive flange.
Figure 7B:
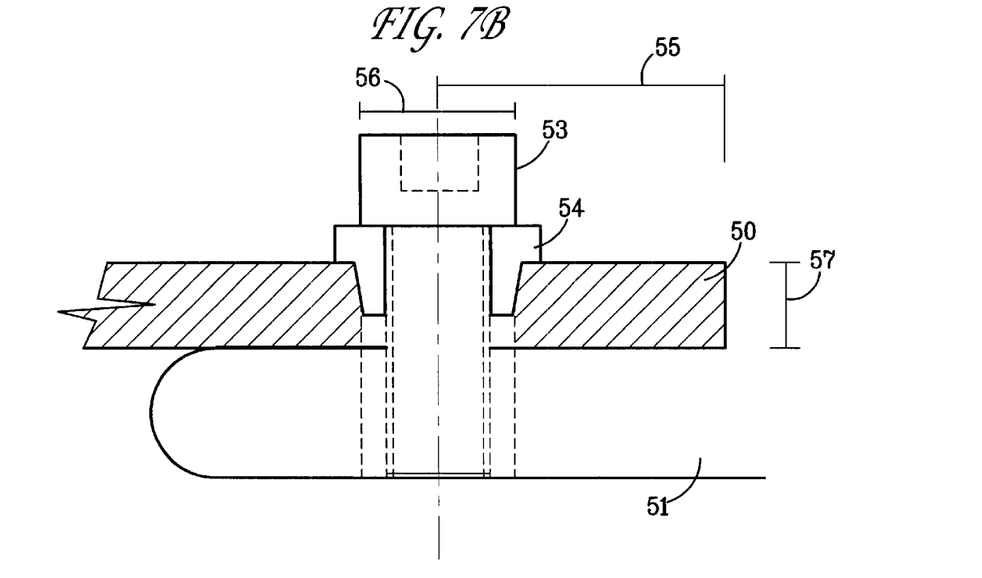
FIG. 7b provides a detailed view of a bolt and conical-shaped nut with a threaded insert combination, used to join the insulating body to the conductive flange.
Figure 7C:
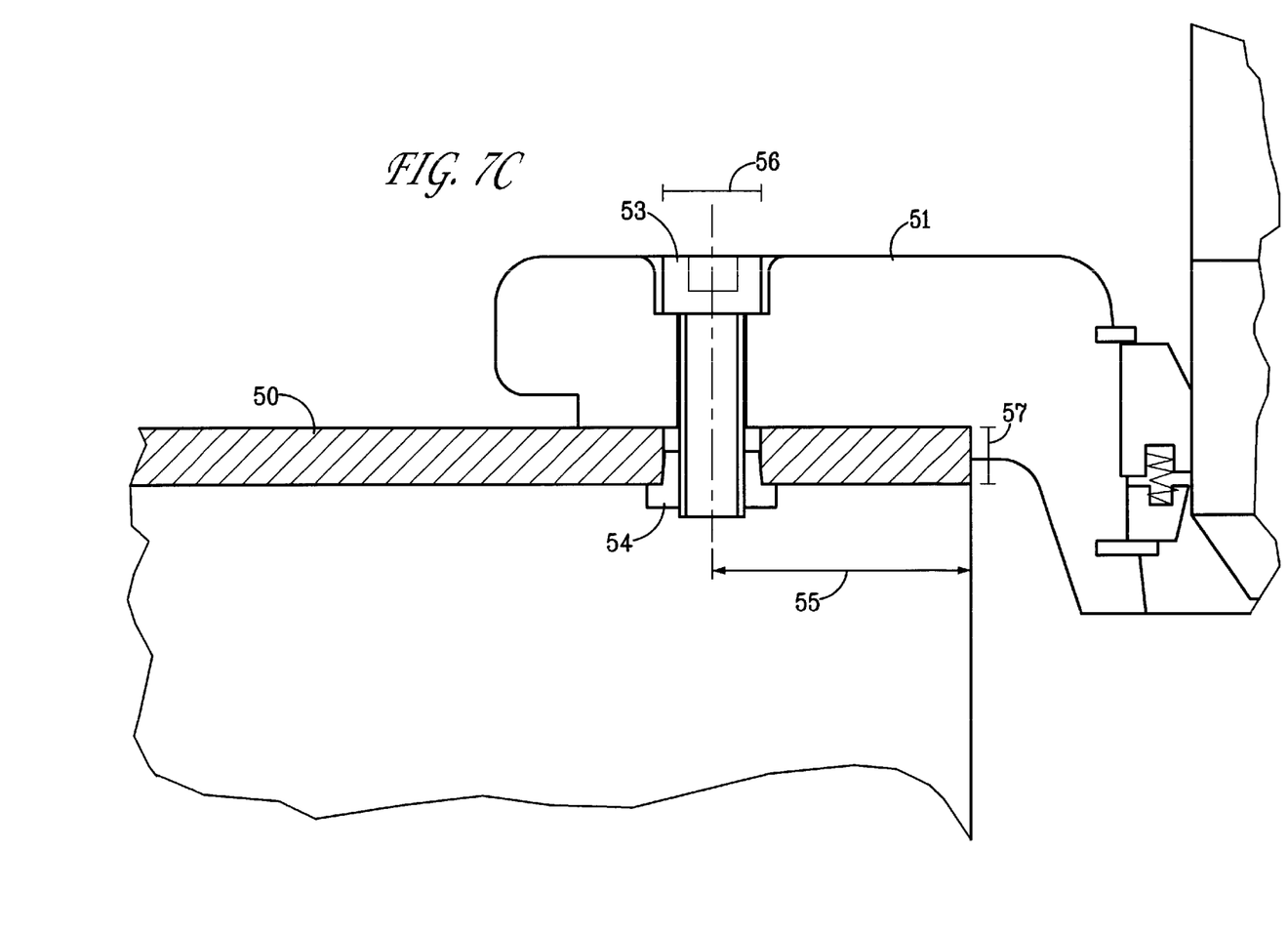
FIG. 7c provides a detailed view of another embodiment of the bolt and conical-shaped nut with a threaded insert combination, used to join an externally mounted conductive flange to an internal insulating body.

The fasteners 52 used to join the insulating body 50 and conductive flange 51 in the present invention can be standard hardware, such as, but not limited to, retention bolt and nut combinations, screws, screw and nut combinations, screw or bolt and washer combinations, or rivets. A conical shape for the fasteners 52 is preferred to radially compress the insulating tube at the cone shape of the bolt, to pre-load the insulating material, and to prevent material degradation at the interface of the fastener and insulating body when variable loads are applied to the insulating body. In preferred embodiments, fasteners 52 are flat-headed, allen bolts, or conical shaped, flat-headed bolts, that are threaded to engage the insulating body, as illustrated in FIG. 7a. In other embodiments, the fasteners selected are bolts 53 in combination with a special conical-shaped nut or washer with a threaded insert 54, as illustrated in FIG. 7b. In still other embodiments, the fasteners are bolts 53 in combination with conical-shaped nut or washers 54 with threaded inserts as illustrated in FIG. 7c. However, unlike the arrangement in FIG. 7b, the arrangement in FIG. 7c depicts the bolt 53 as inserted through an externally mounted conductive flange and internally placed insulating body 50. The interior surface of the flange 51 contacts a portion of the exterior surface of insulating body 50. The conical-shaped nut or washer with a threaded insert 54 is fastened to the end of bolt 53 at the interior surface of insulating body 50.

In preferred embodiments, the diameter of fastener 52 or bolt 53 shown in FIGS. 7a through 7c as 56, selected is a function of sheer strength and is no more than two times the thickness of insulating body 50, shown in FIGS. 7a through 7c as 57. For example, depending upon the size of the electrical switching device, insulating body 50 may have a material thickness which ranges between about 0.25 inches to about 0.5 inches. Therefore, the fastener diameter could range between ⅜ inches to 1 inch. The fastener length could range between ⅜ inches and 2 inches depending upon the thickness of both the insulating body 50 and conductive flange 51. LOCTITE® adhesive (manufactured by Loctite Corporation of Rocky Hill, Conn.) is preferably added to retain fasteners 52 because the insulating body 50 has a lower strength modulus relative to conductive flange 51 and does not fully load the bolt.

Fasteners 52 are preferably located within close proximity to the end of insulating body 50. Referring to FIGS. 7a, 7b and 7c, the distance, 55, between the fasteners 52 and the end of insulating body 50 is no less than two times the diameter of one of fasteners 52. In preferred embodiments, distance 55 is three times the diameter of one of fasteners 52. This distance optimizes the strength of the joint and minimizes interference with the operation of stationary contact assembly 44 and the movable contact assembly 43. However, other multipliers of the fastener diameter may be used without departing from the spirit of the present invention.

Figure 8:
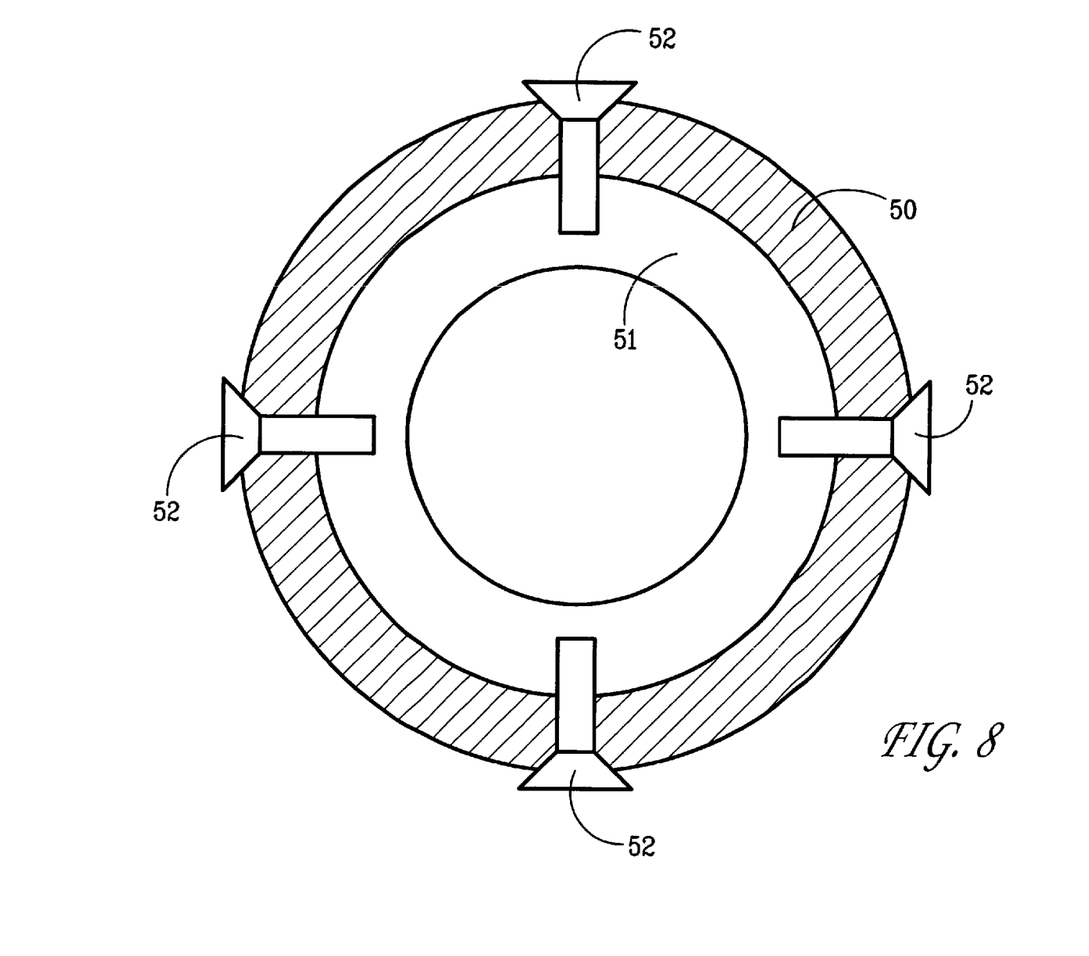
FIG. 8 is detailed, cross-sectional view of one embodiment of the present invention, showing a plurality of fasteners spaced equidistantly apart, and the fasteners substantially protruding from the exterior surface of the insulating body.

The number and spacing of fasteners 52 are dependent upon the size or diameter of insulating body 51. Fasteners 52 are preferably positioned equidistantly (or circumferentially if insulating body 50 is tubular) with respect to each other around the perimeter (or circumference) of insulating body 50 or tube to uniformly attach insulating body 50 to conductive flange 51. Depending upon the desired strength of the joint, the distance or radial distance between the fasteners can be, but is not limited to, between about 1-½" to 2", between about 2" to about 3", or between about 3" to about 441 for a high strength, medium strength, or low strength joint, respectively. The number of fasteners 52 is preferably between 4 and 32, or more preferably between 8 and 16, to provide reliable performance and properly distribute the applied load. However, other quantities and arrangements of fasteners 52 can be used without departing from the spirit of the present invention.

Preferred embodiments of the present invention may be 72 kV, 145 kV, 242 kV, and 362 kV three phase, electric circuit breakers. For these breakers, insulating body 50 is tubular shaped. The diameter of insulating body 50 ranges for these devices is 6 inches, 8 inches, 10 inches and 12 inches for 72 kV, 145 kV, 242 kV, and 362 kV devices, respectively. For a 72 kV device, a quantity of 12 fasteners would yield a high strength joint between insulating body 50 and conductive flange 51 because the radial spacing is about 1.5 inches. By comparison, a quantity of 12 fasteners in a 362 kV device to join insulating body 50 and conductive flange 51 would form a low strength joint because the radial spacing is about 3.15 inches.

The electrical switching device of the present invention is generally assembled by sliding one end of insulating body 50 over one end of conductive flange 51 and securing them together with a plurality of uniformly spaced fasteners 52. The opposite end of insulating body is secured with fasteners 52 to another conductive flange 51 or a portion of conductive tank 46. The conductive flange is preferably dimensioned to contact a portion of the interior surface of insulating body 50. However, in other embodiments, the interior surface of conductive flange 51 may contact a portion of the exterior surface of insulating body 50. The dimensional tolerances of the insulating body 50 and the conductive flange 51 are chosen to pre-load the end of the insulating body 50 against conductive flange 51. This assures an accurate assembly length and prevents loosening due to repeated loads. Fasteners 52 should preferably protrude slightly over the exterior surface of insulating body 50 which facilitates assembly and re-assembly. This slight protrudance of the fasteners 52 aids in maximizing the load carrying capabilities of the joint by compressing insulating body 50 while securing fasteners 52.

The present invention is directed to parts and apparatuses that include, but are not limited to, electrical switching devices, regardless of any specific description in the drawing or examples set forth herein. It will be understood that the present invention is not limited to use of any of the particular parts or assemblies discussed herein. Indeed, this invention can be used in any switching device that requires the need to join two materials of varying strength. Further, the apparatus disclosed in the present invention can be used with the joinder method of the present invention or a variety of other applications.

While the present invention has been particularly shown and described with reference to the presently preferred embodiments thereof, it will be understood by those skilled in the art that the invention is not limited to the embodiments specifically disclosed herein. Those skilled in the art will appreciate that various changes and adaptations of the present invention may be made in the form and details of these embodiments without departing from the true spirit and scope of the invention as defined by the following claims.

What is claimed is:

1. An electrical switching device disposed between a pair of conductors, the device comprising:
   a conductive switching portion for carrying current between the pair of conductors having one or more conductive mounting pieces wherein the conductive mounting piece has an interior surface and an exterior surface;
   an insulating body that comprises an interior surface defining a hollow interior and an exterior surface, and one or more ends wherein a portion of the interior or exterior surface of the conductive mounting piece contacts a portion of the hollow interior or exterior surface of the insulating body; and
   a plurality of fasteners securing one or more ends of the insulating body and the conductive mounting piece together, thereby forming a reversible joint capable of disassembly and reassembly therebetween.

2. The device of claim 1 further comprising a movable contact assembly and a stationary contact assembly.

3. The device of claim 1 wherein the conductive switching portion includes a piston for moving longitudinally to interrupt current between the pair of conductors.

4. The device of claim 1 wherein the insulating body is comprised of a polyester cloth material.

5. The device of claim 1 wherein the insulating body is tubular shaped.

6. The device of claim 5 wherein the fasteners deform a portion of the insulating body.

7. The device of claim 5 wherein the fasteners are spaced circumferentially between about 1.5 inches to about 2 inches apart with respect to each other.

8. The device of claim 5 wherein the fasteners are spaced circumferentially between about 2 inches to about 3 inches apart with respect to each other.

9. The device of claim 5 wherein the fasteners are spaced circumferentially with respect to each other between about 3 inches to about 4 inches.

10. The device of claim 1 wherein the flange contacts a portion of the interior surface of the insulating body.

11. The device of claim 1 wherein the flange contacts a portion of the exterior surface of the insulating body.

12. The device of claim 1 wherein the distance between the fasteners and the end of the insulating body is no less than two times the diameter of the fasteners.

13. The device of claim 12 wherein the distance between the fasteners and the end of the insulating body is three times the diameter of the fasteners.

14. The device of claim 1 wherein the fasteners substantially protrude from the exterior surface of the insulating body.

15. The device of claim 1 wherein the fasteners are flat-headed, allen bolts.

16. The device of claim 1 wherein the fasteners are bolt and conical-shaped nut with a threaded insert combinations.

17. The device of claim 1 wherein the number of fasteners ranges between 4 and 32.

18. The device of claim 1 wherein the number of fasteners ranges between 8 and 16.

19. The device of claim 2 wherein the insulating body is positioned between the movable contact assembly and the stationary contact assembly.

20. An electrical switching device disposed between a pair of conductors, said device comprising:
   a switching, conductive portion for carrying current between said pair of conductors comprising a movable contact assembly and a stationary contact assembly wherein the movable contact assembly and the stationary contact assembly have at least one conductive flange with an exterior surface and an interior surface;
   a insulating tube disposed between the movable and stationary contact assemblies and having an interior surface, and an exterior surface, and one or more ends wherein a portion of interior surface or exterior surface of the insulating tube contacts a portion of the exterior surface or the interior surface of the conductive flange at one or more ends of the insulating tube; and
   a plurality of fasteners that engage the insulating tube and conductive flange such that the insulating tube and conductive flange are coupled together.

21. The device of claim 20 wherein the pair of conductors are an inlet conductor and an outlet conductor for three phase AC current.

22. The device of claim 20 wherein the conductive switching portion includes a piston for moving longitudinally to interrupt current between the pair of conductors.

23. The device of claim 20 wherein a portion of the exterior surface of the flange contacts a portion of the interior surface of the insulating tube.

24. The device of claim 20 wherein a portion of the interior surface of the flange contacts a portion of the exterior surface of the insulating tube.

25. The device of claim 20 wherein the fasteners are retention bolts.

26. The device of claim 25 wherein the diameter of the retention bolts is about twice the thickness of the insulating tube or less.

27. The device of claim 20 wherein the fasteners are flat-headed, allen bolts.

28. The device of claim 20 wherein the fasteners are bolt and conical-shaped nut with a threaded insert combinations.

29. The device of claim 20 wherein the fasteners are spaced equidistantly between about 1.5 inches to about 2 inches apart with respect to each other.

30. The device of claim 20 wherein the fasteners are spaced equidistantly between about 2 inches to about 3 inches apart with respect to each other.

31. The device of claim 20 wherein the fasteners are spaced equidistantly with respect to each other between about 3 inches to about 4 inches.

32. The device of claim 20 wherein the number of fasteners ranges between 4 and 32.

33. The device of claim 20 wherein the number of fasteners ranges between 8 and 16.

34. The device of claim 20 wherein the distance between the fasteners and the end of the insulating body is no less than two times the diameter of the fasteners.

35. The device of claim 34 wherein the distance between the fasteners and the end of the insulating body is three times the diameter of the fasteners.

* * * * *